Oct. 9, 1956  E. ANDERSON  2,765,996
SUPPORTING STANDS FOR SUCTION OPERATED POWER TOOLS
Filed Aug. 20, 1953  3 Sheets-Sheet 1
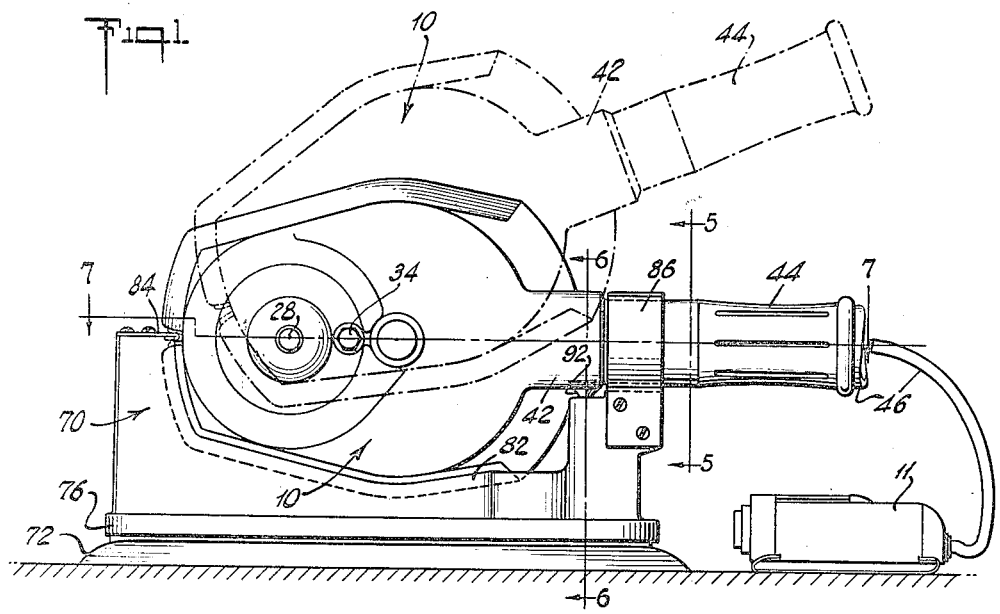
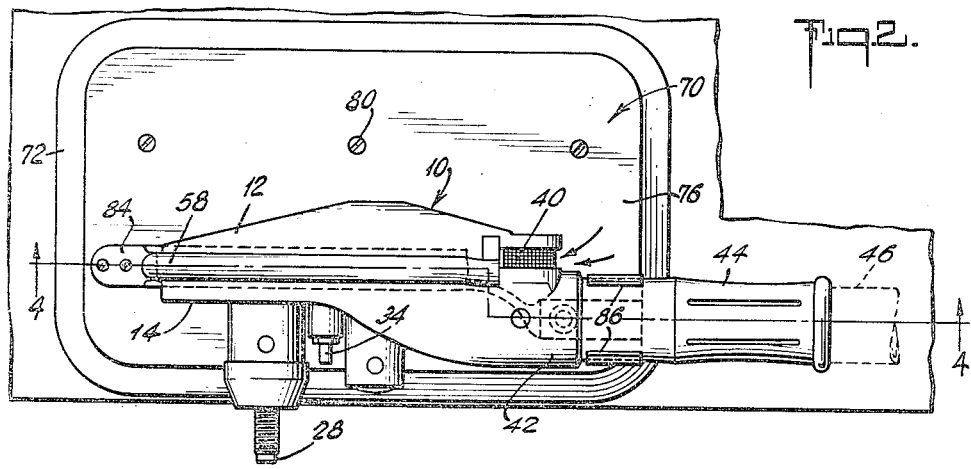
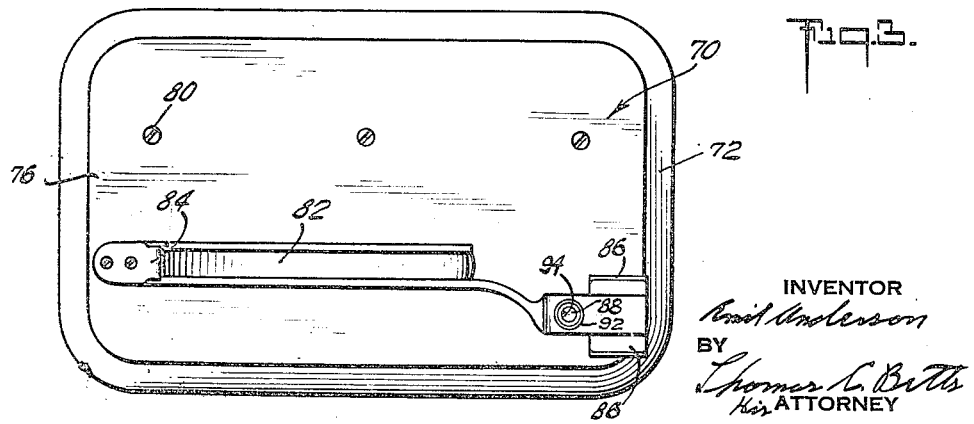
INVENTOR
Emil Anderson
BY
Thomas C. Bitts
his ATTORNEY Oct. 9, 1956  E. ANDERSON  2,765,996
SUPPORTING STANDS FOR SUCTION OPERATED POWER TOOLS
Filed Aug. 20, 1953  3 Sheets-Sheet 2
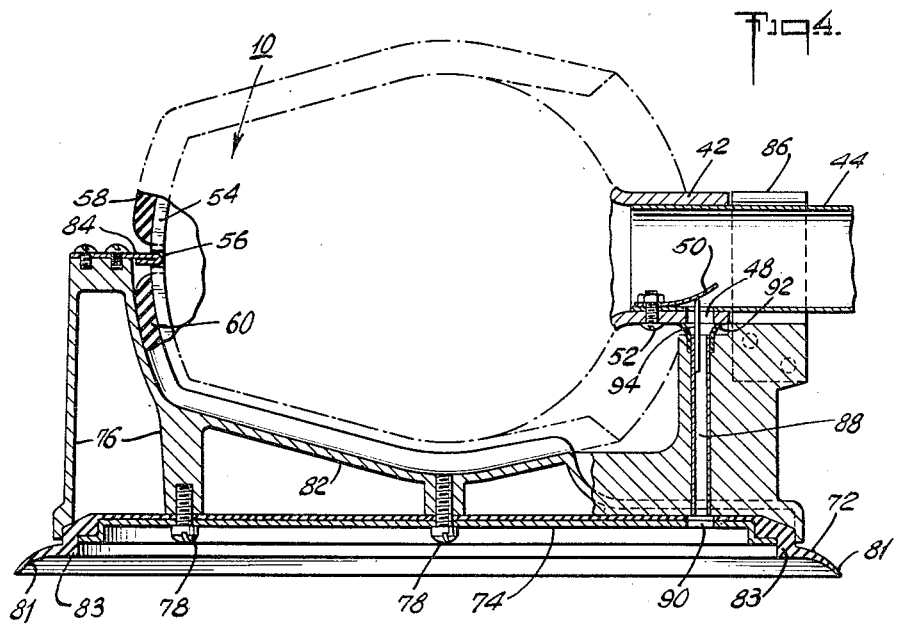
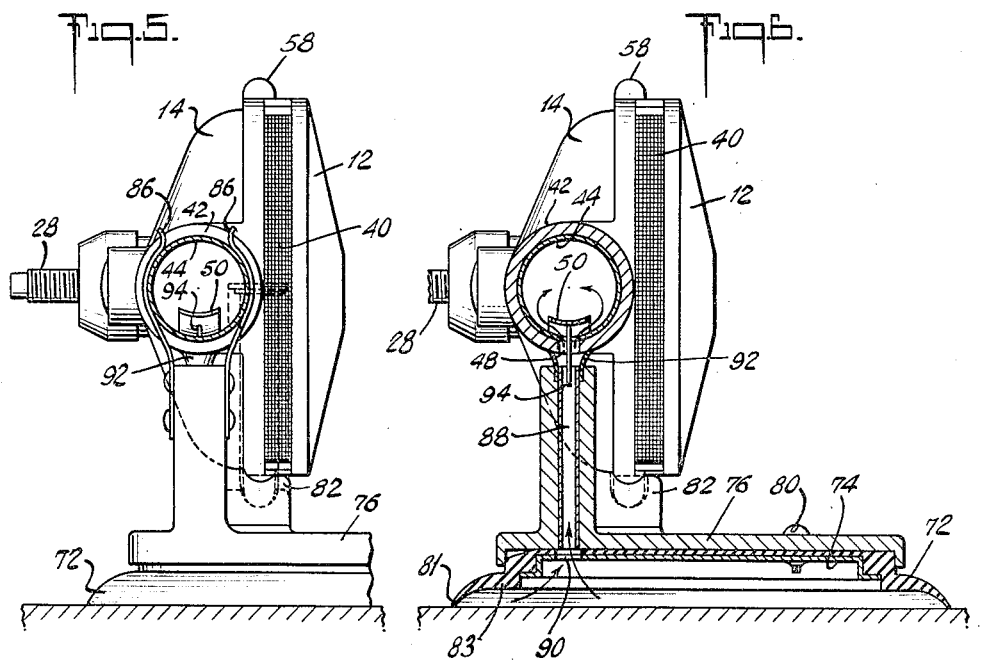
INVENTOR
Emil Anderson
BY
Thomas C. Betts
His ATTORNEY

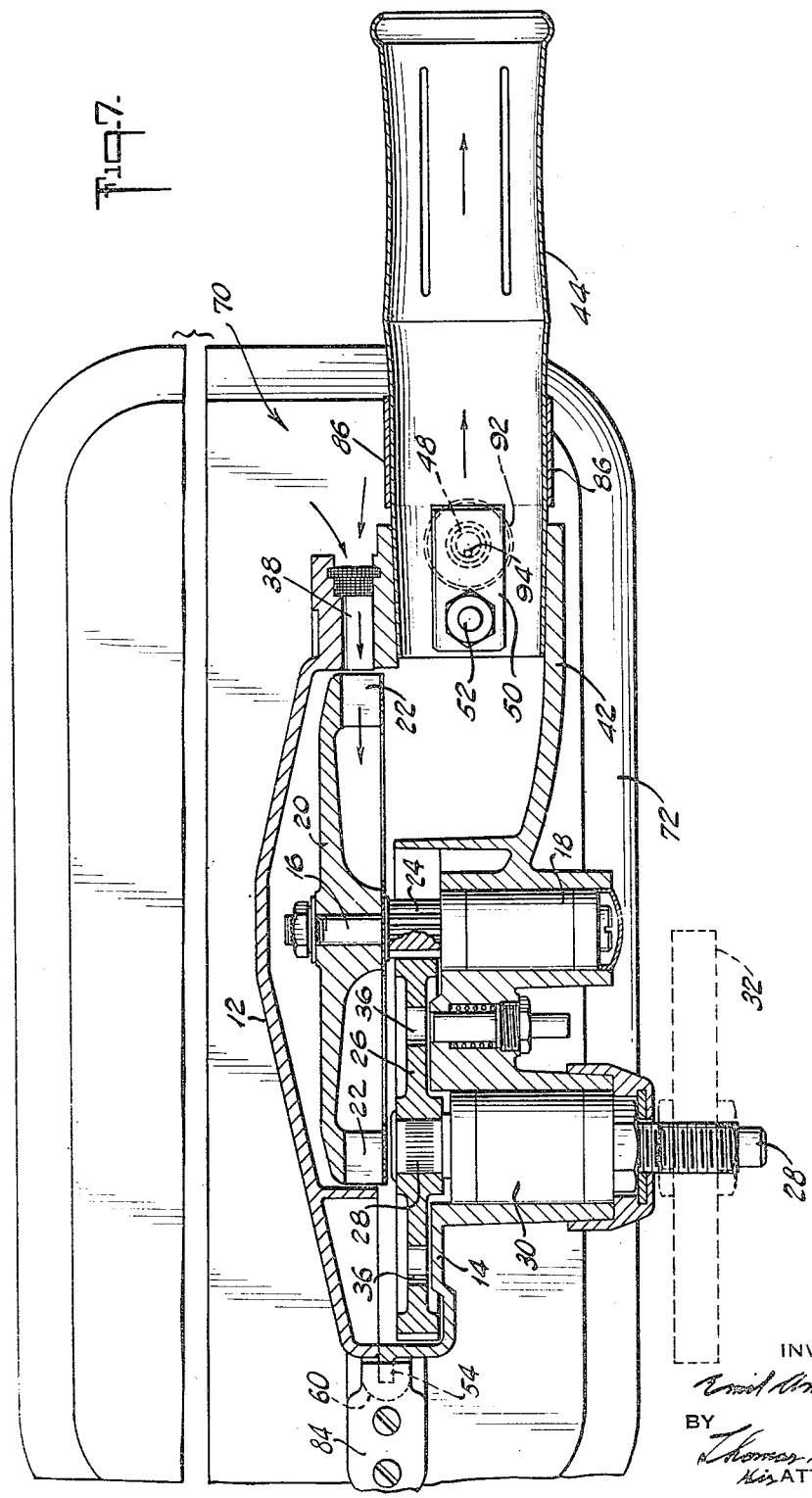

United States Patent Office 2,765,996
Patented Oct. 9, 1956

2,765,996

SUPPORTING STANDS FOR SUCTION OPERATED POWER TOOLS

Emil Anderson, Briarcliff Manor, N. Y., assignor to Electrolux Corporation, Old Greenwich, Conn., a corporation of Delaware Application August 20, 1953, Serial No. 375,393

5 Claims. (Cl. 248—19)

My invention relates to improvements in the combination of a suction air-driven power tool and a stand for supporting the same from and securing it to a worktable or other convenient flat surface.

In accordance with my invention the stand comprises a base portion and an upwardly extending portion forming a cradle and provided with clamping means for removably securing the power tool in the cradle. The base portion is provided with a large suction cup and a conduit is arranged to establish communication between the interior of the suction cup and a port formed in the housing of the air-driven tool, whereby a partial vacuum is established and maintained in the suction cup, thus firmly securing the stand and the power tool to the work surface.

Preferably, a valve is provided which is operable to close the port in the housing of the tool so that there will be no flow of air therethrough in the event the tool is removed from the stand in order to be used as a portable power tool. While this valve may be manually operable, it advantageously is arranged to automatically close when the tool is removed from the stand and to be automatically opened when the tool is secured to the stand.

Further objects and advantages of my invention will be apparent from the following description considered in connection with the accompanying drawings which form a part of this specification and of which;

Fig. 1 is a side view in elevation showing an air-driven power tool and a stand in accordance with my invention, together with a vacuum cleaner, shown on much smaller scale, for providing a source of suction;

Fig. 2 is a top view in elevation of the tool and stand shown in Fig. 1;

Fig. 3 is a top view in elevation of the stand shown in the preceding figures with the power tool removed therefrom;

Fig. 4 is a cross-sectional view taken on the line 4—4 of Fig. 2, the power tool being shown in outline except for the portions thereof which are broken away and shown in cross-section;

Fig. 5 is a cross-sectional view taken on the line 5—5 of Fig. 1;

Fig. 6 is a cross-sectional view taken on the line 6—6 of Fig. 1; and

Fig. 7 is a cross-sectional view taken on an enlarged scale taken on line 7—7 of Fig. 1.

Referring to the drawings, reference character 10 designates generally an air-driven power tool which is adapted to be operated by any suitable source of suction, such as that provided by a domestic vacuum cleaner 11. The tool comprises a housing preferably made of castings 12 and 14 which are suitably joined together. A shaft 16 is rotatably mounted in a bearing 18 supported in the casting 14 and has fixed thereto a turbine wheel 20 having turbine blades 22 suitably arranged around its periphery. Shaft 16 also carries a pinion 24 which meshes with a gear 26 which is mounted on a shaft 28 rotatably supported in bearing 30 carried by casting 14. Shaft 28 extends outwardly from the bearing 30 and is provided with a threaded end to which may be secured various tools, such as the grinding wheel 32, or a chuck of usual form for holding a twist drill or the like. A spring pressed stop pin 34 is mounted in the wall of casting 14 and may be pressed inwardly to engage one of several holes 36 formed in gear 26 in order to hold the gear stationary so that the chuck or the nut holding the grinding wheel may be tightened or loosened.

Casting 12 is formed with a plurality of guide vanes 38 arranged to direct atmospheric air at the proper angle against the turbine blades 22. A screen 40 is preferably located around the outer ends of the guide vanes in order to prevent the introduction therebetween of large solid objects which might damage the turbine wheel. Casting 14 is formed with a tubular portion 42 in which may be secured a tube 44, the tubular portion and the tube forming an outlet for the housing. The outer end of this tube is arranged to frictionally engage a coupling member on the end of a flexible suction hose 46 leading to the suction inlet of the vacuum cleaner 11 or other source of suction.

Tubular outlet 42 and tube 44 are together formed with an opening or port 48. A leaf spring 50 is secured to the interior of the tube by means of a screw 52 and when in normal position overlies the port 48, thus serving as a valve for interrupting flow of air through this port. The strength of the spring 50 is sufficient so that it will not open under the influence of the exterior atmospheric pressure when suction is applied to the interior of the tube 44.

One of the housing castings, such as the casting 14 is, formed with a flange 54 extending around a major portion of its periphery. This flange is formed with a recess 56 at a point opposite the tubular outlet 42. Bumper members 58 and 60 are mounted on the flange 54 and thus extend around a major portion of the periphery of the housing.

The power tool 10 is operated by air flow in a conventional manner. The partial vacuum induced in the housing by the vacuum cleaner 11 through the hose 46, tube 44 and outlet 42 causes atmospheric air to flow inwardly through the screen 40 and over the guide vanes 28 which direct it against the blades 22 of the turbine wheel, thus causing the latter to rotate at a relatively high speed. This rotation is transmitted through the gearing 24 and 26, with a reduction in speed and increase in torque, to the shaft 28 to the outer end of which the various tools may be connected. The device may be used as a portable power tool, inasmuch as it is connected by the flexible hose 46 to a portable source of suction, such as the vacuum cleaner 11. When used in this manner, the valve 50 closes port 48, thus causing all of the air to flow through the turbine.

In order to mount the tool on a bench or the like the stand 70 is provided. This stand comprises a base portion having a substantial area to provide stability and to provide a large area for a suction cup 72 forming part of the base. Within the upper part of the cup is a rigid metal stamping or the like 74. Mounted above the suction cup is a casting 76. The suction cup 72 is secured between the bottom part of this casting and the stamping 74 by means of screws 78 and 80, and is formed with a tapered sealing lip 81 which extends outwardly and downwardly from a thicker portion 83 of the cup and beyond the peripheral edges of stamping 74 and casting 76.

The upwardly extending portion of casting 76 is formed as a cradle 82 having a groove shaped to receive the lower bumper 60 of the power tool. Secured to the left-hand end, as viewed in Figs. 1 through 4 and 7, of the upper portion of the casting is a projecting member 84 which extends horizontally a short distance over the cradle 82. Secured to the opposite end of the upper portion of the casting is a resilient clamp 86 comprising a pair of resilient arms shaped and located so as to resiliently engage the outer surface of the tube 44.

This end of the casting is formed with a passageway 88 which extends vertically through the casting and communicates with an opening 90 formed in the suction cup 72 and stamping 74. A gasket member 92 is secured in the casting at the upper end of the passageway 88 and is arranged to make sealing contact with the exterior of the tubular outlet 42 around the port 48. A pin 94, or other suitable projecting member, extends upwardly from within the passageway 88 so as to extend through the port 48 and displace the valve member 50 to open position, as shown in Figs. 4, 5 and 6.

The power tool 10 is placed in position in the stand 70 by holding the tool in an inclined position, as is shown in broken lines in Fig. 1, from which position it is moved downwardly and to the left, as viewed in this figure, until projection 84 is received within recess 56. Thereafter, the tool is pivoted in a clockwise direction about projection 84 as a fulcrum, whereupon the tube 44 spreads the resilient arms of clamp 86, which arms embrace the tube and hold the power tool in position with the lower bumper 60 resting in the groove of cradle 82. As the tool assumes this position, the gasket 92 contacts the outer surface of the tubular outlet around the port 48 and the pin 94 extends through the port to lift the valve 50.

In order to operate the tool, the vacuum cleaner 11 is started and the suction created thereby is communicated through the hose 46, tube 44 and the tubular outlet to cause the turbine to rotate, as previously described. This suction is also communicated through the open port 48 and the passageway 88 and opening 90 to the interior of the suction cup 72. If the suction cup is placed on a fairly even and impervious surface a partial vacuum is thus created within the cup and the atmospheric pressure acting on the upper exterior surface of the cup holds the stand securely to the surface. The downwardly acting atmospheric pressure flattens out the tapered sealing lip 81 until the thicker portion 83 of the suction cup contacts the supporting surface to thus provide a firm and substantially rigid base. One the partial vacuum has been created in the suction cup there is no further flow of air through the port 48, except the very slight amount which may be necessary to make up for any leakage around the edge of the cup where it seals against the supporting surface. However, such flow, if any, is so slight that it has no measurable effect on the power developed by the turbine.

When it is desired to remove the power tool from the stand, it is conveniently grasped by the tube 44 and pivoted in a counter-clockwise direction about the projection 84 so as to lift the tube 44 from engagement with the clamp 86. As soon as this occurs the pin 94 is withdrawn from the port 48 and the spring valve 50 closes the port so that, if it is desired to use the power tool out of the stand, no air leaks in through the port 48.

While I have shown and described one more or less specific embodiment of my invention, it is to be understood that this has been done for the purpose of illustration only and is not to be considered as limiting my invention, the scope of which is to be determined from the appended claims.

What I claim is:

1. In combination, an air driven tool having a hollow housing formed with an outlet opening adapted to be connected to a source of suction, a base member including a suction cup for securing the base member to a surface, means for removably securing said base member to said housing, a port formed in said housing, conduit means carried by said base for establishing communication between said port and the interior of said suction cup, valve means secured to said housing operable automatically upon removal of said housing from said base and from communication with said conduit to close said port, and means carried by said base for opening said valve when said housing is secured to said base.

2. In combination, an air driven tool having a housing formed with a tubular outlet extending from one end thereof and adapted to be connected to a source of suction, a stand for supporting said tool including a base portion and an upwardly extending portion, a clamp carried by said upwardly extending portion for engaging said tubular outlet to removably secure said tool to said stand, a suction cup carried by said base portion for holding said stand to a surface, a port formed in the lower side of said tubular outlet, a conduit carried by said upwardly extending portion and communicating at one end with the interior of said suction cup, a gasket around the opposite end of said conduit for contacting said tubular outlet around said port to seal said conduit to said port when said tool is secured to said stand, valve means secured to said housing operable to automatically close said port upon the breaking of said seal when the housing is removed from said stand, and means carried by said conduit for opening said valve when said housing is secured to said base.

3. In combination, an air driven tool having a hollow housing formed with a tubular outlet extending from one end thereof and adapted to be connected to a source of suction, a bumper of resilient material extending around a portion of the periphery of said housing, a stand for supporting said tool including a base portion and an upwardly extending portion, the last-mentioned portion forming a cradle for receiving said bumper, a resilient clamp carried by said upwardly extending portion for engaging said tubular outlet to removably secure said tool to said stand with said bumper received in said cradle, a suction cup carried by said base portion for holding said stand to a surface, a port formed in the lower side of said tubular outlet, and a conduit carried by said upwardly extending portion for establishing communication between said port and the interior of said suction cup when said tool is secured to said stand.

4. In combination, an air driven tool having a housing formed with a tubular outlet extending from one end thereof and adapted to be connected to a source of suction, a recess formed in the exterior surface of said housing at the end thereof opposite from said outlet, a bumper of resilient material extending around the lower periphery of said housing between said outlet and said recess, a stand for supporting said tool including a base portion and an upwardly extending portion, the last-mentioned portion forming a cradle for receiving said bumper, a horizontally extending member carried by said last-mentioned portion at one end of said cradle for engagement in said recess, a resilient clamp carried by said last-mentioned portion at the other end of said cradle for engaging said tubular outlet to removably secure said tool to said stand with said member engaged in said recess and said bumper received in said cradle, a suction cup carried by said base portion for holding said stand to a surface, a port formed in the lower side of said tubular outlet, and a conduit carried by said upwardly extending portion for establishing communication between said port and the interior of said suction cup when said tool is secured to said stand.

5. In combination, an air driven tool having a housing formed with a tubular outlet extending from one end thereof and adapted to be connected to a source of suction, a recess formed in the exterior surface of said housing at the end thereof opposite from said outlet, a bumper of resilient material extending around the lower periphery of said housing between said outlet and said recess, a stand for supporting said tool including a base portion and an upwardly extending portion, the last-mentioned portion forming a cradle for receiving said bumper, a horizontally extending member carried by said last-mentioned portion at one end of said cradle for engagement in said recess, a resilient clamp carried by said last-mentioned portion at the other end of said cradle for engaging said tubular outlet to removably secure said tool to said stand with said member engaged in said recess and said bumper received in said cradle, and means for securing said stand to a supporting surface.

References Cited in the file of this patent

UNITED STATES PATENTS

| | | |
|---|---|---|
| 1,130,679 | Staunton | Mar. 2, 1915 |
| 1,515,707 | Stampen | Apr. 6, 1924 |
| 1,530,412 | Ridd | Mar. 17, 1925 |
| 1,579,615 | Howe | Apr. 6, 1926 |
| 1,729,131 | Shaff | Sept. 24, 1929 |
| 2,009,721 | Williams | July 30, 1935 |
| 2,634,076 | Van Dusen | Apr. 7, 1953 |